Patented Nov. 11, 1941

2,262,301

UNITED STATES PATENT OFFICE 2,262,301

WATER TREATMENT

Howard C. Roller, Cincinnati, Ohio, assignor to Neckar Company, Inc., a corporation of New York No Drawing. Application May 29, 1937,
Serial No. 145,584

4 Claims. (Cl. 210—23)

My present invention relates to the treatment of boiler feed water, and the water contents of steam boilers, and has particular reference to chemical treatment therefor.

It is the principal object of my invention to provide a novel treatment for the water for steam boilers, which will prevent scale formation.

It is a further object of my invention to maintain a water content condition in steam boilers which will avoid precipitation of calcium sulphate.

With the above and other objects and advantageous features in view, my invention consists of a novel chemical treatment more fully disclosed in the detailed description following, and more specifically defined in the claims appended thereto.

The standard method for reducing the hardness of feed water for steam boilers includes reduction of the hardness by the addition of hydrate of lime, $Ca(OH_2)$, and soda ash, $Na_2CO_3$, either added together or separately, the resulting chemical reactions being as follows:

$CaSO_4 + Na_2CO_3 = CaCO_3 + Na_2SO_4$
$MgSO_4 + Na_2CO_3 = MgCO_3 + Na_2SO_4$
$MgCO_3 + Ca(OH)_2 = Mg(OH)_2 + CaCO_3$
$Ca(HCO_3)_2 + Ca(OH)_2 = 2CaCO_3 + 2H_2O$
$Mg(HCO_3)_2 + 2Ca(OH)_2 =$
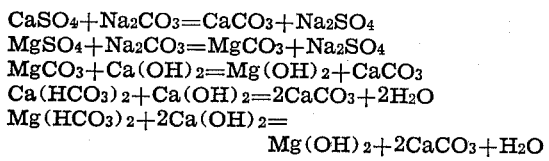
$Mg(OH)_2 + 2CaCO_3 + H_2O$ The above equations are of general nature, and apply when the raw make up water for the boiler feed water contains carbonate and non-carbonate hardness, the insoluble reaction precipitates being calcium carbonate, $CaCO_3$, and magnesium hydroxide, $Mg(OH)_2$, which are removed.

The soda ash and hydrated lime are normally added in excess, the amount of calcium and magnesium salts remaining in solution after the treatment being dependent on the amount of excess reagents added; the larger the excess, in general, the lower the residual hardness.

The excess reagents in the treated water are usually present as sodium carbonate or sodium hydroxide, or both, the sodium hydroxide resulting from the reaction between soda ash and hydrated lime:

$Na_2CO_3 + Ca(OH)_2 = 2NaOH + CaCO_3$
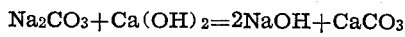

When raw water is treated as described above, for use in steam boilers, it is common practice to use sufficient lime to maintain a slight amount of hydroxide in addition to sodium carbonate. I have found that scale formation is prevented if the above described treatment is carried out in such a manner that the effluent from the treatment process contains sodium carbonate and sodium bicarbonate.

Although sodium carbonate is quite stable at lower temperatures, say below 300° F., at higher temperatures such as prevail in steam boilers, the sodium carbonate will liberate carbon dioxide thereby being converted into hydroxide, this dissociation being illustrated by the equation $Na_2CO_3 + H_2O = 2NaOH + CO_2$ Only part of the sodium carbonate will be dissociated upon entering the boiler, this dissociation normally resulting in a condition whereby an inadequate amount of carbonate radical remains in solution to prevent formation of calcium sulphate scale. If the water is treated in such a manner that sodium bicarbonate is present in the effluent, it then becomes possible to maintain in the boiler water a sufficient amount of carbonate radical to prevent scale formation.

The presence of sodium bi-carbonate in the effluent can be ensured, if the water before treatment contains considerable quantities of calcium or magnesium bicarbonate or both, by adding soda ash to the raw water, the conversion being $Ca(HCO_3)_2 + Na_2CO_3 = 2NaHCO_3 + CaCO_3$
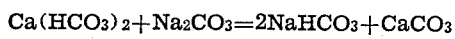

If the water before treatment contains little or no bi-carbonate of calcium or magnesium, the presence of sodium bi-carbonate is ensured by adding bi-carbonate of soda during the treatment.

This step is of particular importance if the treatment process is carried out at a temperature of 212° F. or higher; at this temperature the halfbound carbon dioxide in calcium or magnesium bi-carbonate is readily driven off while sodium bi-carbonate will retain its halfbound carbon dioxide.

The use of sodium bi-carbonate in the treatment process increases the amount of dissolved carbon dioxide introduced into a steam boiler with the feedwater so treated. This increase in carbon dioxide has a beneficial effect on the prevention of scale formation on the heating surface of the boiler.

I have further found that a similar beneficial effect will result by feeding sodium bi-carbonate direct to the water contents of a steam boiler, instead of during the treatment of purifying feed water, or by feeding carbon dioxide gas direct to the water contents of the steam boiler.

The above described chemical treatments result in the maintenance of sufficient carbonate radical in solution in the boiler water to effectively prevent scale formation.

I have described a novel procedure for ensuring the maintenance of an adequate amount of carbonate radical in the water contents of a steam boiler, whereby scale formation is prevented; changes in the steps followed and in the chemicals used may be made to conform to different boiler water and raw water conditions, without departing from the spirit and the scope of the invention as defined in the appended claims.

I claim:

1. The method of preventing scale formation in a steam boiler, comprising the steps of reducing the hardness of the water by adding hydrated lime and soda ash to the make-up water, and adding a compound containing a half-bound carbon dioxide radical capable of retaining said radical at temperatures of 212° F. or higher, to maintain a substantial amount of carbonate radical in solution in the water content of the boiler.

2. The method of preventing scale formation in a steam boiler, comprising the steps of reducing the hardness of the water by adding hydrated lime and soda ash to the make-up water, and adding sufficient sodium bicarbonate to the make-up water during the initial treatment for reducing the hardness thereof to maintain a substantial amount of carbonate radical in solution in the water content of the boiler.

3. The method of preventing scale formation in a steam boiler, comprising the steps of reducing the hardness of the water by adding hydrated lime and soda ash in excess quantity to the boiler water, and adding sodium bicarbonate to the water content of the boiler to maintain a substantial amount of carbonate radical in solution in the water content of the boiler.

4. The method of preventing precipitation of calcium sulphate in the water content of a steam boiler, comprising the steps of reducing the hardness of the water by adding hydrate of lime and soda ash in excess quantities, and adding a compound containing a half-bound carbon dioxide radical capable of retaining said radical at 212° F. or higher, to maintain a substantial amount of carbonate radical in solution in the boiler water content.

HOWARD C. ROLLER.